(12) United States Patent
Rehr et al.

(10) Patent No.: US 7,833,103 B2
(45) Date of Patent: Nov. 16, 2010

(54) METHOD AND DEVICE FOR PRODUCING A LINK ON A DRIVE-SHAFT OF A MOTOR VEHICLE

(75) Inventors: Alfred Rehr, Hepberg (DE); Roland Pfersich, Wettstetten (DE); Gerald Seebacher, Hitzhofen (DE); Paul Witte, Eitensheim (DE)

(73) Assignee: Audi AG, Ingolstadt (DE)

( * ) Notice: Subject to any disclaimer, the term of this patent is extended or adjusted under 35 U.S.C. 154(b) by 397 days.

(21) Appl. No.: 11/660,139

(22) PCT Filed: Jun. 24, 2005

(86) PCT No.: PCT/EP2005/006831
§ 371 (c)(1),
(2), (4) Date: Feb. 13, 2007

(87) PCT Pub. No.: WO2006/015658
PCT Pub. Date: Feb. 16, 2006

(65) Prior Publication Data
US 2007/0248403 A1 Oct. 25, 2007

(30) Foreign Application Priority Data
Aug. 13, 2004 (DE) ........................ 10 2004 039 268

(51) Int. Cl.
*F16D 1/06* (2006.01)
(52) U.S. Cl. ........................ 464/23; 464/906; 29/407.09
(58) Field of Classification Search ......... 464/144–146, 464/170, 180, 906, 23, 182; 73/468, 470; 29/407.01, 407.02, 407.05, 407.09, 434, 29/525, 525.01, 505.02
See application file for complete search history.

(56) References Cited

U.S. PATENT DOCUMENTS

| | | | | |
|---|---|---|---|---|
| 1,434,690 A | * | 11/1922 | Edwards | .................. 464/182 X |
| 4,920,627 A | * | 5/1990 | Aikins et al. | |
| 5,334,096 A | * | 8/1994 | Iwao | ......................... 464/146 |
| 6,273,825 B1 | * | 8/2001 | Schwarzler et al. | ......... 464/146 |
| 6,893,349 B2 | * | 5/2005 | Krugman et al. | .............. 464/23 |
| 2003/0042690 A1 | * | 3/2003 | Oki et al. | |

FOREIGN PATENT DOCUMENTS

| | | |
|---|---|---|
| DE | 102 51 056 | 5/2004 |
| EP | 0 671 568 | 9/1995 |
| EP | 1 340 922 | 9/2003 |

* cited by examiner

*Primary Examiner*—Greg Binda
(74) *Attorney, Agent, or Firm*—Novak Druce + Quigg LLP

(57) ABSTRACT

A linkage generally consisting of a first shaft having a first connecting component provided with an annular in a face thereof, disposed coaxially with such first shaft; a second shaft having a second connecting component provided with an annular disposed axially with the second shaft inserted in the annular recess of the first component; and a set of circumferentially spaced threaded fasteners securing such first and second components together, wherein the first and second components are angularly displaced relative to a common axis thereof so that a residual imbalance of one of such components offsets a residual imbalance of the other of such components.

11 Claims, 4 Drawing Sheets

METHOD AND DEVICE FOR PRODUCING A LINK ON A DRIVE-SHAFT OF A MOTOR VEHICLE

This application is a U.S. National Stage of PCT/PCT/EP2005/006831, having been filed Jun. 24, 2005, which claims priority from DE 1020040392684, having been filed on Aug. 13, 2004, each of which is hereby incorporated by reference in its entirety.

The invention relates to a method for producing a link on a drive-shaft of a vehicle.

BACKGROUND OF THE INVENTION

A connection of rotating parts such as this is described, for example, in EP 0 671 568 B1 on the basis of a drive connection between a crankshaft of a motor vehicle and a gear unit. In order to achieve precise rotation of the crankshaft (or other drive shaft) in relation to the flanged portion of the gear unit it is proposed that the connection between the outer articulated part and the flange component be configured with a force-fitted centering collar. While this does ensure assembly of the connection free of play, production with very small tolerances is required. Relatively high insertion or removal moments may also occur during assembly of the connection. In addition, any residual imbalances which may be present on the individual structural components may not be counterbalanced.

The object of the invention is to propose a process for production of a generic connection which is more favorable from the production and functional viewpoints and which permits greater simplicity of assembly. A preferred device for conduct of the process is also presented.

SUMMARY OF THE INVENTION

In the present invention, a specific residual imbalance of at least one of the structural components is determined and marked on the circumference and that the structural component, offset, is fastened to the other structural component in such a way that the residual imbalance with the concentricity error is essentially offset. This results initially in simpler production, since the structural components may be produced within the clearance fit. In the case of the balancing processes of the components necessarily required a specific residual imbalance, the position of which is marked, may be accepted. In this instance it is made certain during assembly that the offsetting of one structural component in relation to another generally occurring during clearance fitting is achieved by compensation of the offsetting by the residual imbalance of the structural component or components.

As a further development of the invention a specific residual imbalance of both structural components may be determined and marked, the markings being overlapped at least more or less during assembly. This increases the quietness of the components in the area of connection and simplifies assembly or coordination of the components.

In the process the markings of the residual imbalances of the two components may be applied so as to be displaced by the same angular area clockwise and counterclockwise. The two residual imbalances of the components with the specific offsetting or the dynamic imbalance thus form a circulating triangle with free mass moments equaling zero in the most favorable case. The markings of the two components may by preference each be displaced 60 degrees in relation to the imbalance position and thus by 120 degrees in relation to each other and to the offset.

In addition, the annular contact surfaces of the components may be designed so that a specific offsetting of the components in relation to each other is effected during assembly. This ensures targeted offsetting accompanied by assembly easy to execute.

A radially external area of the annular contact surfaces of the components may in the process be axially reset so that the offsetting in question is effected when the bolt positioned closest to the markings is tightened. This measure as well greatly simplifies assembly and ensures the structurally intended position of the offset to the marked residual imbalances of the components.

In the preferred device for producing the connection it is proposed to configure the annular contact surface of one or both structural components reset at least in the area of the bolts and radially to the outside to the centering collar. This measure may be accomplished by simple production means and, when one of the bolts of the connection is tightened on one side, effects tilting of the component to be fastened to a specific offsetting inside the centering collar.

The annular contact surface of a component may be for this purpose be configured to be conical, but it is proposed by preference that the contact surface be configured to be stepped in cross-section, with an annular recess extending radially outward to the centering collar. The centering collar may by preference be mounted on the flange component.

In addition, a disk defining the recess in question may be positioned radially inside the bolts, by preference between the components or their contact surfaces. This results in simplified production, in which the recess is obtained automatically by introduction of the disk in question.

In addition, for the sake of simplicity of effecting a sealing function, the disk may have a sealing ring on its outer circumference adjacent to the contact surfaces.

Lastly, the disk may be configured to be plate-shaped as a cap which terminates the joint as the one component in the axial direction toward the flange component.

DETAILED DESCRIPTION OF THE PREFERRED EMBODIMENTS OF THE INVENTION

Figure 1:
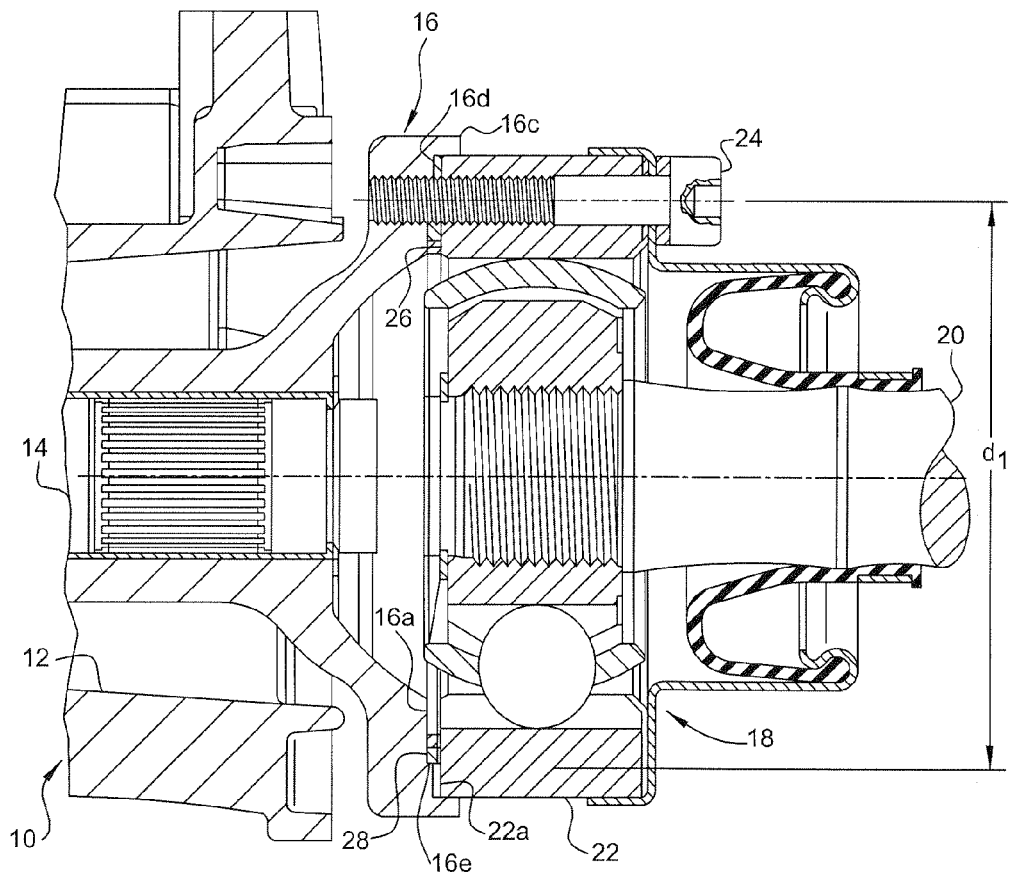
FIG. 1 illustrates, as a longitudinal section, a connection transmitting torque between a flange component of a gear unit and the outer joint part of a crankshaft in motor vehicles, FIG. 2 an enlarged section in the joining area of the connection shown in FIG. 1, FIG. 3 the joining area shown in FIG. 2, illustrating offsetting of the outer joint part in relation to the flange component during assembly.

In FIG. 1 10 designates only a section of a differential gear in the housing 12 of which an input shaft 14 is mounted so as to be rotatable. A rotation-symmetric component, a flange component 16, is fastened on the input shaft 14.

Another flange component, joint 18, of a drive shaft 20, only a section of which is illustrated, is connected to the flange component 16 in a manner yet to be described so as to transmit torque.

For this purpose the annular outer joint part 22 of the joint 18 (in this instance a homokinetic synchronizing joint of customary commercially available design) is uniformly connected by means of six bolts 24 uniformly distributed over the external circumference of this joint to the flange component 16, the bolts 24 (also see FIG. 2) extending through annular contact surfaces 16a and/or 22a in the joining area (=radial plane of separation between the flange component 16 and the outer joint part 22). Appropriate through bores 22b are provided in the outer joint part 22 and appropriate threaded bores 16b in the flange component 16. The six bolts 24 are positioned in a uniform bolt-hole circle $d_i$.

A centering collar 16c projecting axially beyond the contact surface 16a is formed on the flange component 16 for the purpose of centering the outer joint part 22 in relation to the flange component 16. The outer diameter of the outer joint part 22 and the internal diameter of the centering collar 16c are from the viewpoint of dimension designed as clearance fit with a relatively large tolerance band, that is, the component is compressible for ease of assembly.

Figure 2:
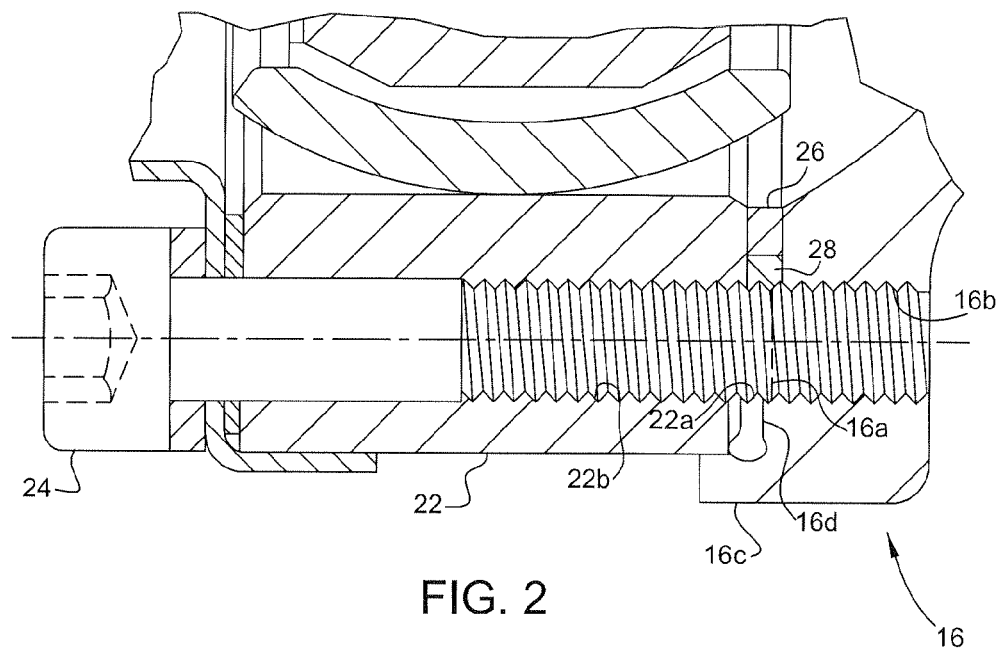

In addition, an annular steel disk 26 of specific strength having a sealing ring 28 of specific strength vulcanized on its external circumference has been added between the contact surface 16a of the flange component 16 and the contact surface 22a of the outer joint part 22 (see upper half of FIG. 1 and FIG. 2). The rotation-symmetric disk 26 with sealing ring 28 has been designed so that it is positioned by its external circumference inside the circular opening d, and inside the bolts 24 (external disk diameter=circular opening diameter d, minus bolt diameter). The result is a stepped course of the contact surface 16a, which is suitably reset radially outside the disk 26 with sealing ring 28 to centering collar 16c or forms an annular recess 16d.

The recess 16d may also be worked directly into the contact surface 16a of the flange component 16 or the contact surface 22a of the outer joint part 22. Optionally the contact surface 16a and/or the contact surface 22a may be configured to be slightly tapered rather than stepped.

Figure 4:
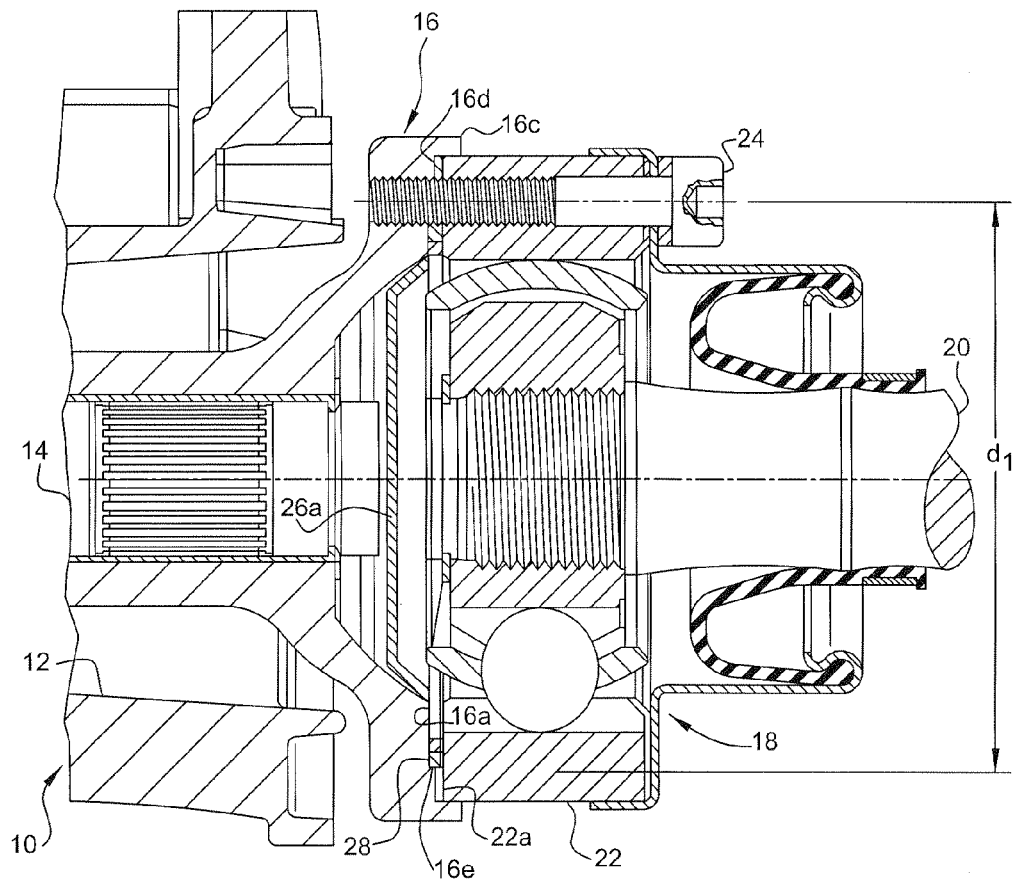
FIG. 4 illustrates, as a longitudinal section, a connection transmitting torque between a flange component of a gear unit and the outer joint part of a crankshaft in motor vehicles.

As is to be seen in FIG. 4, the disk 26 may also be produced in a closed configuration as a plate-shaped cap 26' and the joint 18 thus suitably encapsulated.

In addition, an annular member, for example, the annular disk 26 or the cap 26' may be held centered on a recess or an annular shoulder 16e worked into the mating or contact surface 16a or 22a (FIG. 1). The recess or annular shoulder 16e then encloses the disk 26 axially to a distance, which is smaller than the thickness of the disk 26 or cap 26'.

The following process is carried out in production of the connection described:

First the input shaft 14 is balanced with the flange component 16 in a suitable device (not shown) and any specific residual imbalance is provided with a marking 30 (such as a colored dot or an impression on the external circumference of the flange component 16). However, the marking 30 is displaced 60 degrees clockwise and applied at the position of the residual imbalance.

The drive shaft 20 is similarly counterbalanced with the joint 18 and the specific residual imbalance is marked on the external circumference of the outer joint part 22. However, the marking 31 is applied counterclockwise after displacement through 60 degrees over the circumference.

If the two markings 30 and 31 are now made to overlap in assembly of the connection, the residual imbalances are displaced 120 degrees in relation to each other.

Figure 3:
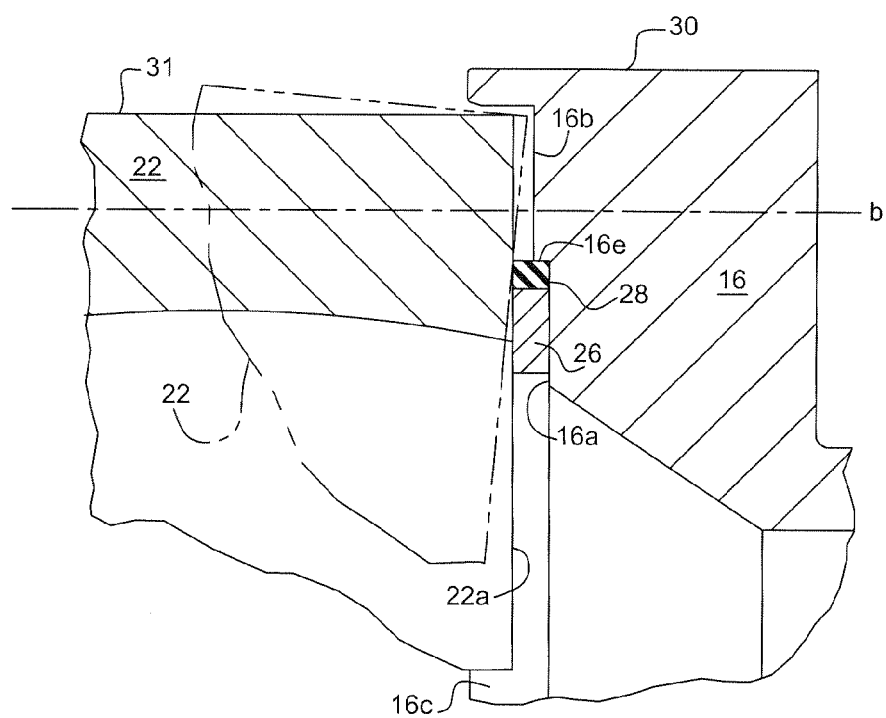

The six bolts 24 are then inserted loosely into the flange component 16 and then the bolt 24 positioned next to the markings is tightened by a specific torque. This tightening of a bolt 24 on one side, in conjunction with the configuration described in the foregoing of the contact surface 16a with the recess 16d, effects tilting (or angular displacement) of the outer joint part 22 (shown in exaggerated form by dashed lines in FIG. 3) in relation to the flange component 16 and common axis b, thereof, as a result of which the outer joint part 22 is positioned on the centering collar 16c or intentionally offset from it, as a result of the telescopic guiding in the centering collar 16c at the point diametrically opposite the tightened bolt 24 or its circumferential area.

If the other bolts 24 are now tightened, the outer joint part 22, as experiments have shown, remains in the intentionally offset position, which as a triangle is opposite the position of the two residual imbalances, that is, diametrically opposite the markings. The dynamic imbalance resulting from offsetting of the joint 18 and the drive shaft 20 at least essentially equals the residual imbalances of the input shaft 14 and flange component 16 and the joint 18 and drive shaft 20.

The invention is not restricted to the exemplary embodiment described. Thus, only one residual imbalance may be determined and marked on the flange component 16 or the joint 18. The marking is then positioned exactly, that is, with no displacement, on the residual imbalance, which is then followed by a diametrically opposite offsetting of the outer joint part 22 from the flange component 16 as described in the foregoing. Optionally the threaded bores 16b of the flange component 16 and/or the through bores 22b of the outer joint part 22 may be worked in only after balancing and/or determination of the residual imbalances in question, it then being possible to bring a threaded bore 16b or a through bore 22b into axial alignment with the marking in question for the residual imbalance.

The connection as described may also be used on other rotation-symmetrical components or drive connection.

Figure 5:
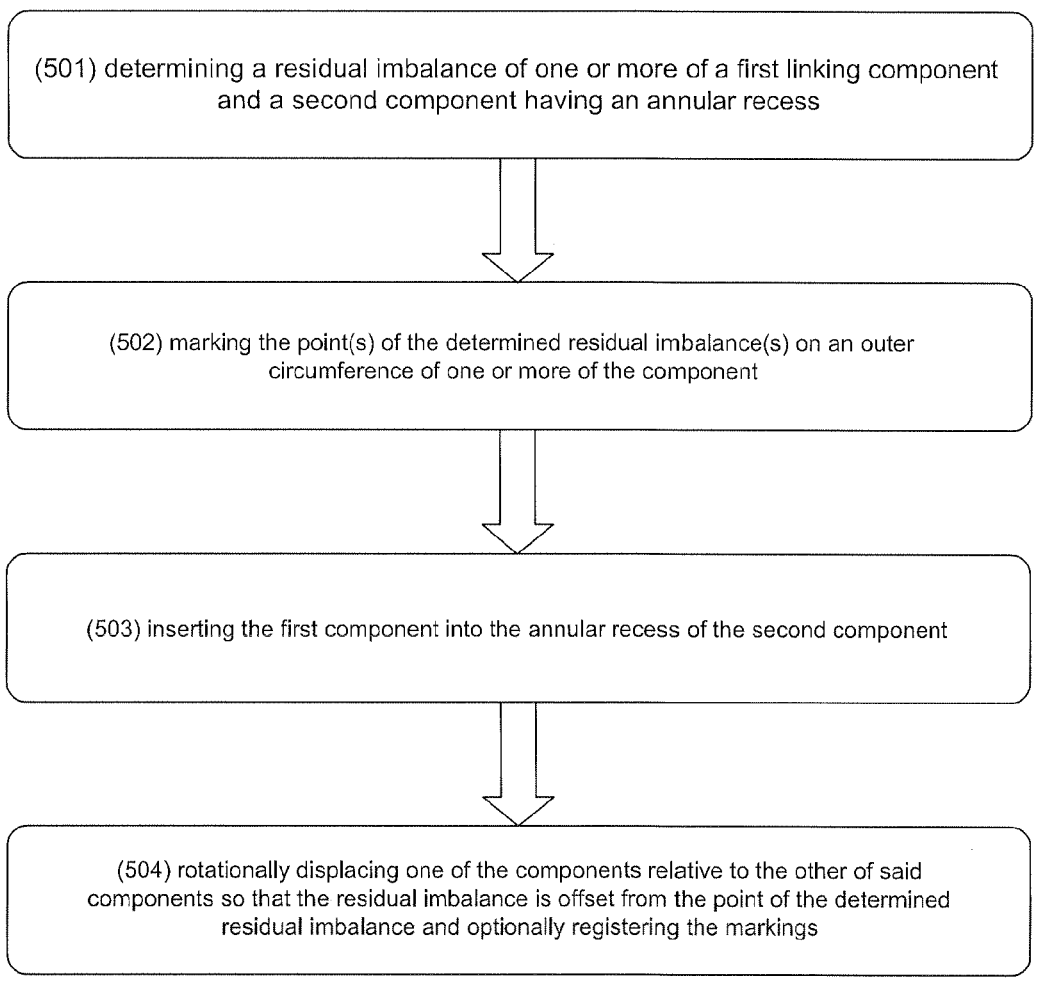
FIG. 5 is a flow chart, illustrating a method of joining a drive shaft of a motor vehicle.

FIG. 5 is a flow chart, illustrating a method of joining a drive shaft of a motor vehicle. The method can include steps 501 determining a residual imbalance of one or more of a first linking component and a second component having an annular recess; 502 marking the point(s) of the determined residual imbalance(s) on an outer circumference of one or more of the component; 503 inserting the first component into the annular recess of the second component; and 504 rotationally displacing one of the components relative to the other of said components so that the residual imbalance is offset from the point of the determined residual imbalance and optionally registering the markings.

The invention claimed is:

1. A linkage comprising:
a first shaft having a first connecting component provided with an annular recess in a face thereof, disposed coaxially with said first shaft;
a second shaft having a second connecting component provided with an annular portion disposed coaxially with said second shaft, inserted in said annular recess of said first component; and
a set of circumferentially spaced threaded fasteners securing said first and second components together,
wherein said first and second components are angularly displaced relative to a common axis thereof so that a residual imbalance of one of said components offsets a residual imbalance of the other of said components.

2. A linkage according to claim 1 including an annular member disposed between mating surfaces of said first and second components.

3. A linkage according to claim 2 wherein said annular member includes an annular seal disposed about an outer surface thereof.

4. A linkage according to claim 2 wherein said annular member is disposed in a recess of a mating surface of said second component.

5. A linkage according to claim 2 wherein said annular member is disposed within the circumference of said threaded fasteners.

6. A method of joining a drive shaft of a motor vehicle, having a first linking component to a rotation-symmetrical input shaft thereof, having a second component provided with an annular recess, comprising:

determining a residual imbalance of at least one of said components;

marking the point of the determined residual imbalance on an outer circumference of said one component;

inserting said first component into the annular recess of said second component;

rotationally displacing one of said components relative to the other of said components so that the residual imbalance is offset from the point of the determined residual imbalance; and fastening said components together with a set of threaded fasteners while said components are mutually disposed to provide said offset.

7. The method according to claim 6 including determining the residual imbalances of both of said components; marking the respective points of said residual imbalances on said components; and rotationally displacing said components relative to each other to register said markings.

8. The method according to claim 7 wherein the markings of the residual imbalances of said components are applied after the components have been rotated the same angle in opposite directions in relation to the point of the determined residual imbalance of each component respectively.

9. The method according to claim 8 wherein said components are each angularly displaced 60° relative to the point of the determined residual imbalance of each component respectively.

10. The method according to claim 6 wherein annular mating surfaces of said components are configured in a manner whereby when one of said threaded fasteners is tightened on a side of said components, a space between said components is produced.

11. The method according to claim 10 wherein an area of the annular mating surfaces of said components disposed radially outwardly is configured to be axially reset in a manner whereby said space is produced upon tightening said threaded fasteners disposed nearest said markings.

* * * * *